(12) United States Patent
Finkenwirth et al.

(10) Patent No.: US 6,354,775 B1
(45) Date of Patent: Mar. 12, 2002

(54) METHOD OF OPERATING A GEAR SHAPING MACHINE

(75) Inventors: Klaus Finkenwirth, Altusried; Peter Meon, Karlsruhe, both of (DE)

(73) Assignee: Liebherr-Verzahntechnik GmbH, Ettlingen (DE)

( * ) Notice: Subject to any disclaimer, the term of this patent is extended or adjusted under 35 U.S.C. 154(b) by 0 days.

(21) Appl. No.: 09/679,597

(22) Filed: Oct. 5, 2000

(30) Foreign Application Priority Data

Oct. 7, 1999 (DE) .......................................... 199 48 134

(51) Int. Cl.7 .................................................. B23F 5/18
(52) U.S. Cl. .......................................... 409/34; 409/60
(58) Field of Search .............................. 409/31, 33, 34, 409/35, 42, 58, 60

(56) References Cited

U.S. PATENT DOCUMENTS 4,136,302 A * 1/1979 Tlaker et al. ................. 409/34
4,695,209 A * 9/1987 Noguchi et al. ............... 409/60

FOREIGN PATENT DOCUMENTS

DE          28 57 550          7/1978
DE          38 28 482          6/1989

* cited by examiner

*Primary Examiner*—Daniel W. Howell
(74) *Attorney, Agent, or Firm*—Paul Vincent

(57) ABSTRACT

During operation of a gear shaping machine comprising a thrust spindle which accommodates a cutting wheel and is guided and disposed in a guidance on the machine housing, the radial force acting on the cutting wheel during operation is detected by means of at least one sensor disposed in the area of the guidance, which detects the changes of the radial force occurring during operational wear of the cutting wheel and uses increases of the radial force, beyond the tolerance typical for this machine, as a signal for influencing the operation of the gear shaping machine, e.g. for stopping the machine.

10 Claims, 1 Drawing Sheet

METHOD OF OPERATING A GEAR SHAPING MACHINE

This application claims Paris Convention priority of DE 199 48 134.2 filed Oct. 07, 1999 the complete disclosure of which is hereby incorporated by reference.

BACKGROUND OF THE INVENTION

The invention concerns a method of operating a gear shaping machine comprising a thrust spindle having a cutting wheel and being guided and disposed in a guidance on the machine housing.

Gear shaping machines serve, in particular, for producing gears or gear segments, which require high finishing accuracy for many applications. For mass production, accuracy must be guaranteed together with high machine efficiency. The finishing accuracy requires corresponding high accuracy of the geometry of the cutting wheel which is impaired by any kind of wear of or also damage to the tool. Wear of and damage to the cutting wheel moreover reduce the cutting performance of the tool thereby leading to high processing forces.

This, in turn, increases wear disproportionally and can result in breakage of the tool. Excessive, in particular, asymmetrical wear of the cutting wheel produces unnecessary large abrasion during re-sharpening thereby reducing the service life of the tool or increasing the tool costs.

Conventionally, monitoring of the cutting wheel wear or cutting wheel damage was done by the user of the machine and has required good observation skills and a high degree of experience. The mere assumption that the tool is worn or the cutting wheel is damaged demands stoppage of the machine to enable either more thorough inspection or removal of the cutting wheel.

In gear shaping machines having a hydraulically driven thrust spindle, it is known (DE 28 57 550 C2) to measure the pressure in the hydraulic cylinder which is determined i.a. by the axial cutting force and the cutting speed. Wear of the cutting wheel results in an increase in the axial cutting force and this, in turn, leads to an increase of the hydraulic system pressure. This pressure can be utilized for detecting the wear of the cutting wheel, and the operational parameters, e.g. the cutting speed, can be adapted to the wear. This method is uncertain since the measured pressure is not completely determined by the cutting force or changes therein. Furthermore, it cannot be implemented with mechanical drives still widely used today.

It is the underlying object of the invention to propose a method by means of which wear of or damage to the cutting wheel of a gear shaping machine can be determined with high accuracy, independently of the type of drive, and converted into suitable operational measures for the machine.

SUMMARY OF THE INVENTION

This object is achieved in accordance with the invention in that the radial force acting on the cutting wheel during operation is detected by means of at least one sensor disposed in the area of the guidance of the thrust spindle, that the change of the radial force which occurs with wear of the cutting wheel during operation is detected, and increases of the radial force beyond a tolerance typical for the machine are used as a signal for influencing the operation of the gear shaping machine.

The wear of or damage to the cutting wheel resulting in an increase of the processing forces in the radial direction has, conventionally, not been directly used for operation of the gear shaping machine. The invention detects the change, in particular, the increase in the radial force during wear of the cutting wheel and changes in this radial force are recorded. These changes usually entail increases in the radial force. If the increase exceeds a tolerance limit stored in the sensor itself, in the machine control or in a separate computer, a signal is produced which is used to directly influence operation of the gear shaping machine.

The manner in which the machine is influenced can vary largely. If the radial force exceeds e.g. a predetermined relatively high value or if the radial force increase rises progressively with time, the signal can be used to output a warning signal or directly, to stop the machine for exchanging e.g. the cutting wheel.

It is moreover possible to define the wear limit as a maximum value for the typical wear expected for given operational parameters such that when the wear limit has been reached, the signal can be used to prevent renewed start of the gear shaping machine and the machine can be restarted only after exchange of the tools. This expected wear has been conventionally determined in a fictitious manner exclusively via work piece counters, without taking into consideration wear differing from that expected.

The method in accordance with the invention can be used with any type of drive—hydraulic or mechanical—in an equally advantageous manner. It is moreover very precise since the radial force present in the guidance is not superposed with other parameters which would taint the accuracy of the technique.

A pressure sensor can be used as sensor which accepts at least the hydraulic pressure in the hydraulic system of a hydrostatic bearing of the thrust spindle. Such a hydrostatic bearing consists in general of several bearing pockets evenly distributed about the periphery such that, in accordance with the inventive method, one pressure sensor is preferably associated with each bearing pocket.

In another embodiment, the sensor may be at least one strain gauge disposed on the housing close to the guidance of the spindle. Also in this case, it is recommended to dispose several strain gauges in a radially symmetrical arrangement.

A preferred embodiment provides that the difference of the radial forces accommodated by several sensors, which are radially symmetrically disposed, are stored as reference values in the sensor itself, in the machine control or in a separate computer, and that the signal is obtained from the change with respect to the reference value occurring during operation. This variant offers, in particular, the possibility to determine and safely store the reference value before start of operation of the gear shaping machine by comparison measurement during idling and during the cutting operation. The reference value designated by the manufacturer for a certain type of machine can be determined for this machine and the operator of the machine must only carry out wear measurements.

The invention is described below by means of the drawing.

DESCRIPTION OF THE PREFERRED EMBODIMENT

Figure 2:
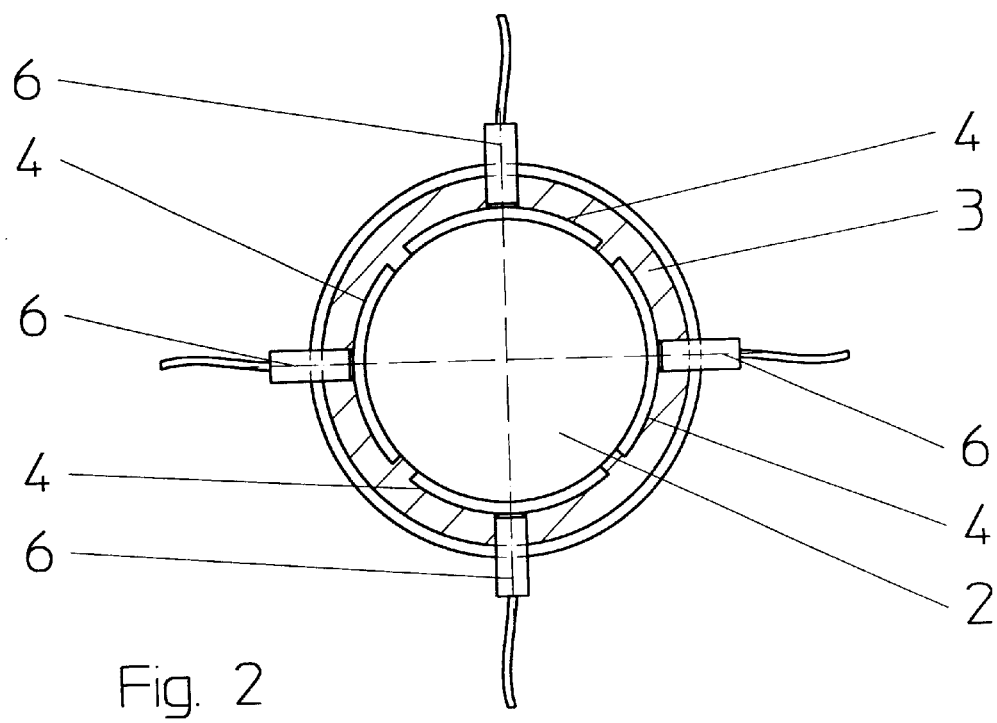
FIG. 2 shows a section II—II in accordance with FIG. 1.

The housing 1 of a gear shaping machine accommodates the thrust spindle 2 disposed in a guidance having a hydrostatic bearing 3 comprising several, e.g. four, pockets 4 (FIG. 2) which are disposed in radially symmetrical arrangement. The tool, a cutting wheel 5, is clamped at the front end of the thrust spindle 2. Each of the pockets 4 of the hydrostatic bearing 3 is associated with a schematically indicated pressure sensor 6 which is disposed e.g. in the hydraulic line 8 or in the pockets 4 and is loaded by the hydraulic pressure in each pocket 4. Cutting wheel 5 wear, in particular asymmetrical wear, results in an increase in the hydraulic pressure in that pocket which is opposite to the location of wear. The pressure change is directly proportional to the radial force change and thus a measure of the wear of or damage to the cutting wheel 5. The pressure change or pressure gradient provides a direct signal of the wear condition and/or wear progress and can thus be used to influence the operation of the gear shaping machine.

Figure 1:
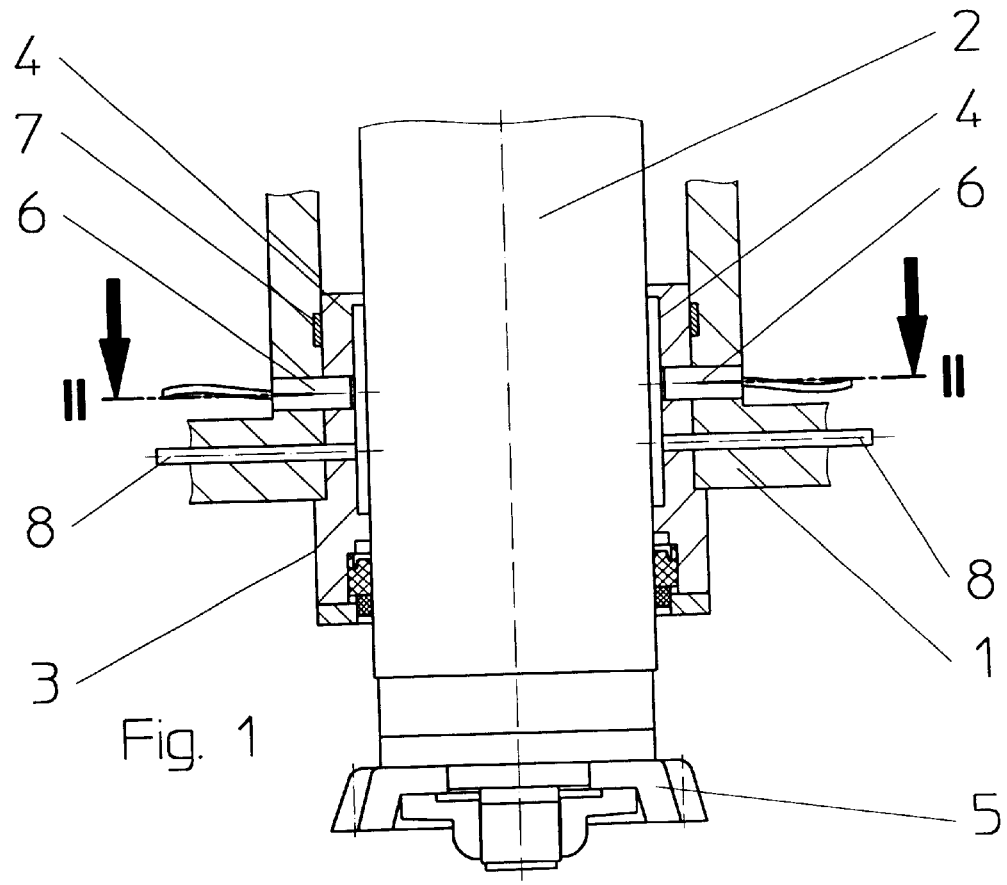
FIG. 1 shows a schematic axial section through the thrust spindle of a gear shaping machine.

Instead of the pressure sensors 6 in the hydraulic lines 8 of the hydrostatic bearing 3, it is possible to provide strain gauges 7, in radially symmetrical arrangement, (FIG. 1) on the housing 1 in the area of the guidance of the thrust spindle 2, e.g. at the level of the hydrostatic bearing 3. The change of the radial forces, acting on the housing, which results from the wear, leads to change of the forces acting on the strain gauges 7.

We claim:

1. A method of operating a gear shaping machine, the machine having a thrust spindle bearing a cutting wheel, the thrust spindle disposed within a guidance of a machine housing, the method comprising the steps of:
    a) disposing at least one sensor in a region of the guidance;
    b) detecting, using said at least one sensor, a radial force acting on the cutting wheel during operation of the gear shaping machine;
    c) monitoring, during operation of the machine, changes in said radial force associated with wear of the cutting wheel;
    d) influencing an operation of the gear shaping machine when said radial force increases beyond a limit which is typical for that machine.

2. The method of claim 1, wherein step d) comprises stopping a drive of the gear shaping machine.

3. The method of claim 1, wherein step d) comprises exchanging the cutting wheel.

4. The method of claim 1, wherein step d) comprises preventing a new start of the gear shaping machine.

5. The method of claim 1, wherein said at least one sensor is at least one pressure sensor loaded by hydraulic pressure in an hydraulic system of a hydrostatic bearing of the guidance.

6. The method of claim 5, wherein said hydrostatic bearing comprises several bearing pockets, wherein each bearing pocket has an associated pressure sensor.

7. The method of claim 1, wherein said at least one sensor is at least one strain gauge, disposed on the guidance of the spindle.

8. The method of claim 7, wherein several strain gauges are disposed in a radially symmetrical fashion.

9. The method of claim 1, wherein step a) comprises disposing several sensors in a radially symmetrical fashion, step c) comprises storing differences in radial forces acting on said several sensors as a reference value, and step d) comprises generating an influencing signal obtained from change, with respect to said reference value, occurring during operation.

10. The method of claim 9, wherein said reference value is detected before start of operation of the gear shaping machine by comparison measurement during idling and during cutting operation and is permanently stored for this machine.

* * * * *